US009608977B2

(12) United States Patent
Boss et al.

(10) Patent No.: US 9,608,977 B2
(45) Date of Patent: *Mar. 28, 2017

(54) CREDENTIAL VALIDATION USING MULTIPLE COMPUTING DEVICES

(71) Applicant: International Business Machines Corporation, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,784

(22) Filed: Feb. 17, 2016

(65) Prior Publication Data

US 2016/0173476 A1     Jun. 16, 2016

Related U.S. Application Data

(63) Continuation of application No. 14/509,489, filed on Oct. 8, 2014, now Pat. No. 9,298,901.

(51) Int. Cl.
*H04L 29/06* (2006.01)
*G06F 21/31* (2013.01)

(52) U.S. Cl.
CPC .............. *H04L 63/08* (2013.01); *G06F 21/31* (2013.01); *G06F 21/316* (2013.01); *H04L 63/083* (2013.01); *G06F 2221/2103* (2013.01)

(58) Field of Classification Search
CPC ....... H04L 63/08; H04L 63/083; G06F 21/31; G06F 21/316

(Continued)

(56) References Cited

U.S. PATENT DOCUMENTS

| 8,006,300 | B2 | 8/2011 | Mizrah |
| 8,195,576 | B1 * | 6/2012 | Grigg .................... G06Q 20/20 380/229 |

(Continued)

FOREIGN PATENT DOCUMENTS

| GB | 2281991 A | 3/1995 |
| WO | 2011041073 A1 | 4/2011 |
| WO | 2013163625 A1 | 10/2013 |

OTHER PUBLICATIONS

Darmawan et al., "WebSphere Portal Collaboration Security Handbook", IBM Corporation, Redbooks, Dec. 2004.

(Continued)

*Primary Examiner* — Michael S McNally
(74) *Attorney, Agent, or Firm* — Maeve Carpenter

(57) ABSTRACT

A tool for credential validation using multiple computing devices. The tool select at least one challenge question. The tool selects two or more user owned devices, wherein selecting the two or more user owned devices includes querying a database for each user owned device associated with a user account. The tool presents the at least one challenge question to the two or more user owned devices. The tool determines whether the at least one response received from the two or more user owned devices is a correct response relative to the at least one challenge question.

20 Claims, 3 Drawing Sheets

(58) Field of Classification Search
USPC .......................................................... 726/7
See application file for complete search history.

(56) References Cited

U.S. PATENT DOCUMENTS

| | | | |
|---|---|---|---|
| 8,705,720 B2 | 4/2014 | Kurapati et al. | |
| 2006/0212702 A1* | 9/2006 | Firestone | H04L 9/3271 713/168 |
| 2008/0146193 A1* | 6/2008 | Bentley | G06F 21/34 455/411 |
| 2008/0159534 A1* | 7/2008 | Rager | G06F 21/31 380/247 |
| 2008/0168540 A1* | 7/2008 | Agarwal | H04W 4/02 726/5 |
| 2008/0319896 A1* | 12/2008 | Carlson | G06Q 20/02 705/38 |
| 2009/0210927 A1 | 8/2009 | Mokuya et al. | |
| 2010/0100898 A1 | 4/2010 | Pfleging et al. | |
| 2011/0307694 A1 | 12/2011 | Broustis et al. | |
| 2012/0072975 A1 | 3/2012 | Labrador et al. | |
| 2012/0131658 A1 | 5/2012 | Ramaswamy et al. | |
| 2012/0216260 A1* | 8/2012 | Crawford | G06F 21/31 726/5 |
| 2013/0191902 A1 | 7/2013 | Friedl et al. | |
| 2013/0222109 A1 | 8/2013 | Lim | |
| 2013/0340058 A1 | 12/2013 | Barnes et al. | |
| 2014/0047510 A1 | 2/2014 | Belton et al. | |
| 2014/0115670 A1 | 4/2014 | Barton et al. | |
| 2014/0129834 A1 | 5/2014 | Brill et al. | |
| 2014/0255036 A1 | 9/2014 | Jovicic et al. | |
| 2014/0337956 A1 | 11/2014 | Korgaonkar | |
| 2015/0089621 A1 | 3/2015 | Khalid et al. | |
| 2015/0271177 A1 | 9/2015 | Mun | |
| 2015/0350204 A1 | 12/2015 | Wang et al. | |

OTHER PUBLICATIONS

Honan, "How Apple and Amazon Security Flaws Led to My Epic Hacking", Aug. 6, 2012, <http://www.wired.com/2012/08/apple-amazon-mat-honan-hacking/>.
Madan et al., "Securely Adopting Mobile Technology Innovations for Your Enterprise Using IBM Security Solutions"; IBM Corporation, 2013.
"Multi Multi-Factor Authentication", Authy Blog, Nov. 21, 2013, <http://blog.authy.com/multi-device>.
Sabzevar et al., "Universal Multi-Factor Authentication Using Graphical Passwords", IEEE, 2008, pp. 625-632.
U.S. Appl. No. 14/509,489, entitled "Credential Validation Using Multiple Computing Devices", filed Oct. 8, 2014.
U.S. Appl. No. 14/509,643, entitled "Utilizing Multiple Computing Devices to Verify Identity", filed Oct. 8, 2014.
Appendix P (List of IBM Patents or Patent Applications Treated as Related) filed Feb. 17, 2016.

* cited by examiner

CREDENTIAL VALIDATION USING MULTIPLE COMPUTING DEVICES

BACKGROUND OF THE INVENTION

The present invention relates generally to cyber security, and more particularly to credential validation across multiple computing devices.

Some computing systems that utilize a password to authenticate a user provide the capability to reset a forgotten password if the user can correctly answer one or more private security questions, such as "What is your mother's maiden name". While this security feature provides a way to verify the identity of the user, the security questions asked are often answered by information that is publicly available, and as such, are easily circumvented. Additionally, harvesting programs designed to gather this information from various public sources are often employed by computer hackers to obtain answers to commonly asked security questions. Therefore, the use of common security questions and answers are for the convenience of the users, and not for the security of the system.

SUMMARY

Aspects of an embodiment of the present invention disclose a method, system, and computer program product for credential validation using multiple computing devices. The method includes selecting, by one or more computer processors, at least one challenge question. The method includes selecting, by one or more computer processors, two or more user owned devices, wherein selecting the two or more user owned devices includes querying a database for each user owned device associated with a user account. The method includes presenting, by one or more computer processors, the at least one challenge question to the two or more user owned devices. The method includes determining, by one or more computer processors, whether the at least one response received from the two or more user owned devices is a correct response relative to the at least one challenge question.

DETAILED DESCRIPTION

Embodiments of the present invention recognize that hackers are using publically available information to reset user passwords to gain access to accounts. Embodiments of the present invention further recognize that exposing a challenge question to the public provides a hacker with an opportunity to spoof a system by finding personal or publically available information to overcome the challenge question.

Embodiments of the present invention provide the capability to utilize multiple user owned devices, linking them in an ordered method, to bolster security through additional scrutiny in credential validation. Embodiments of the present invention further provide the capability to present challenge questions to specific user owned devices, and receive responses from the specific user owned devices in a predetermined order. Embodiments of the present invention further provide the capability to authenticate a user's credentials based, at least in part, on the response, the device where the response originated, and the order in which multiple responses are received.

Implementation of such embodiments may take a variety of forms, and exemplary implementation details are discussed subsequently with reference to the Figures.

Figure 1:
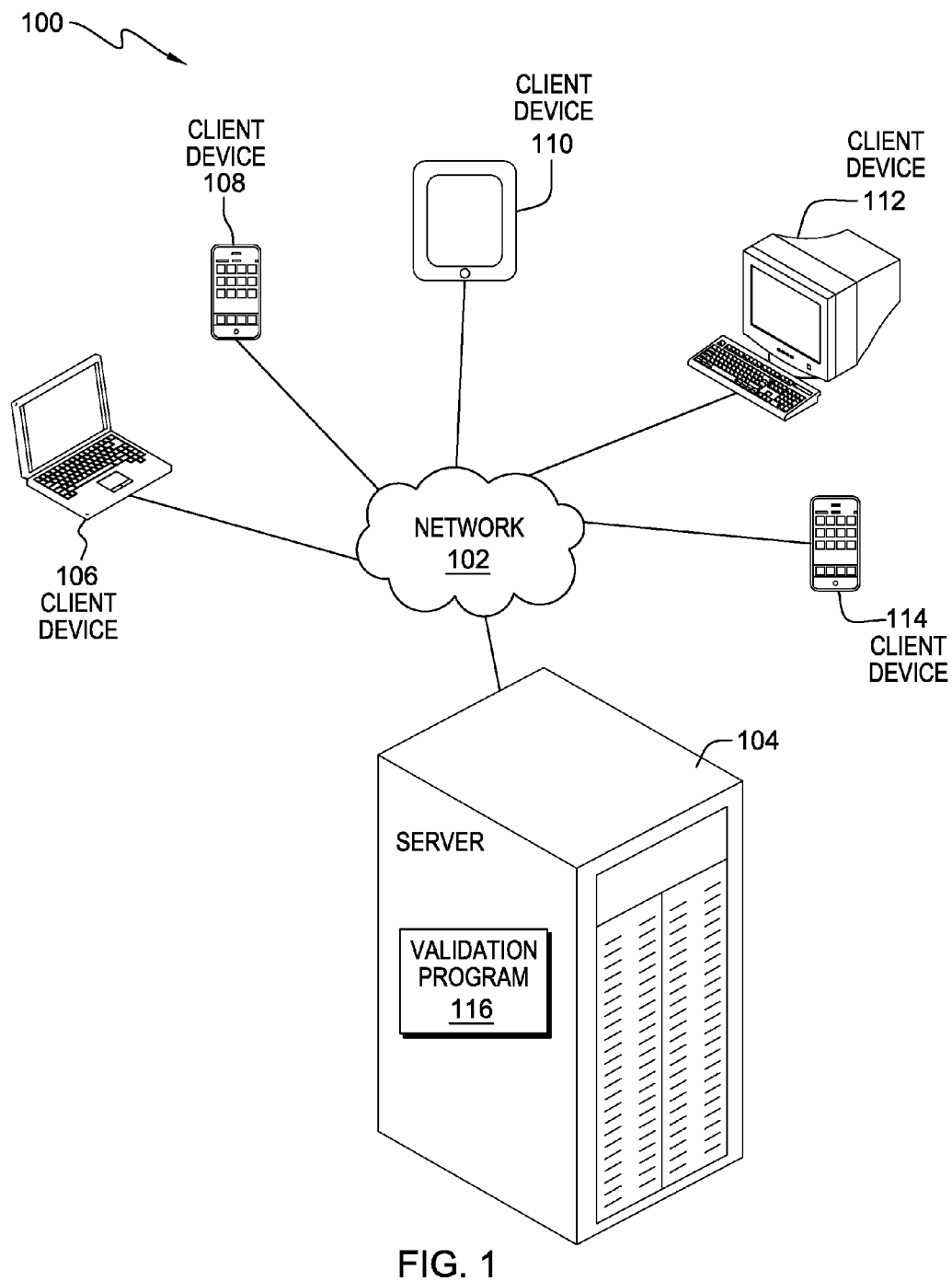
FIG. 1 illustrates a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, and multiple client devices, such as client device 106, client device 108, client device 110, client device 112, and client device 114.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, client device 110, client device 112, and client device 114 are interconnected by network 102. Network 102 can be any combination of connections and protocols capable of supporting communications between server 104, client device 106, client device 108, client device 110, client device 112, client device 114 and validation program 116. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications.

In the exemplary embodiment, server 104 includes a validation program 116 for credential validation using multiple computing devices. Validation program 116 is a software-based program capable of providing additional security in credential validation by presenting one or more challenge questions to a plurality of user owned devices, such as client devices 106, 108, 110, 112, and 114, configured to a user account. In one embodiment, validation program 116 operates in conjunction with a service utilizing identity verification through computing device collaboration to provide an additional level of scrutiny in verifying a user's identity. For example, validation program 116 may operate in conjunction with a software-based program capable of authenticating a user owned device, such as client device 106, by utilizing one or more hardware identification attributes unique to the user owned device to generate a hash, wherein the hash may include a plurality of device specific information gathered from one or more hardware identification attributes. Validation program 116 may utilize the utilizes a plurality of user owned devices, such as client devices 106, 108, 110, 112, and 114, from a topology of trusted devices, to validate a user's identity through sending a challenge question to the plurality of user owned devices within the topology of trusted devices, and determining whether one or more responses relative to the challenge question is valid.

In the exemplary embodiment, validation program 116 presents the one or more challenge questions to the plurality of user owned devices in a specified order, wherein the specified order applies to an order of challenge questions validation program 116 presents to the plurality of user owned devices, as well as an order of each the plurality of user owned devices to which validation program 116 presents the one or more challenge questions. In the exemplary embodiment, validation program 116 utilizes a validation program agent application (not shown) installed on each of the plurality of user owned devices to present the one or more challenge questions to each of the plurality of user owned devices. In the exemplary embodiment, validation program 116 validates a response to the one or more challenge questions, and repeats this process for a predefined number of user owned devices participating in the topology of trusted devices. In the exemplary embodiment, to successfully validate the user's credentials, validation program 116 receives a valid response for each of the one or more challenge questions, wherein the valid response must also be received in a specified order relative to other valid responses, and from a specified device. In response to successfully validating the response for each of the one or more challenge questions, validation program 116 confirms the user's credentials and allows the password to be reset.

In the exemplary embodiment, validation program 116 operates on a central server, such as server 104, and can be utilized by one or more client devices, such as client devices 106, 108, 110, 112, and 114 via a mobile application download from the central server or a third-party application store, and executed on the one or more client devices as an agent to validation program 116. For example, a user can communicate with validation program 116 via a validation program agent application (not shown) downloaded and installed on one or more user owned devices. In another embodiment, validation program 116 may be a software-based program, downloaded from a central server, such as server 104, and installed on one or more client devices, such as client devices 106, 108, 110, 112, and 114. In yet another embodiment, validation program 116 may be utilized as a software service provided by a third-party cloud service provider (not shown).

In the exemplary embodiment, client devices 106, 108, 110, 112, and 114 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 108 and client device 114 may be mobile devices capable of connecting to a network, such as network 102, to access a website or a mobile application requiring identity verification, such as a mobile banking application.

In an alternate embodiment, client devices 106, 108, 110, 112, and 114 may be any wearable electronic device, including wearable electronic devices affixed to or integrated with eyeglasses and sunglasses, helmets, wristwatches, clothing, wigs, and the like, capable of sending, receiving, and processing data. For example, client device 106 and client device 110 may be a wearable electronic device, such as a wristwatch, capable of executing an application and initiating a password reset request, or any other suitable credential validation process, for example, in the course of communicating with a website (e.g., logging into a social networking site or purchasing goods) or accessing mobile application (e.g., logging into a mobile banking application to check account status).

Data processing environment 100 may include additional client devices, servers, networks, displays, and other devices not shown.

Figure 2:
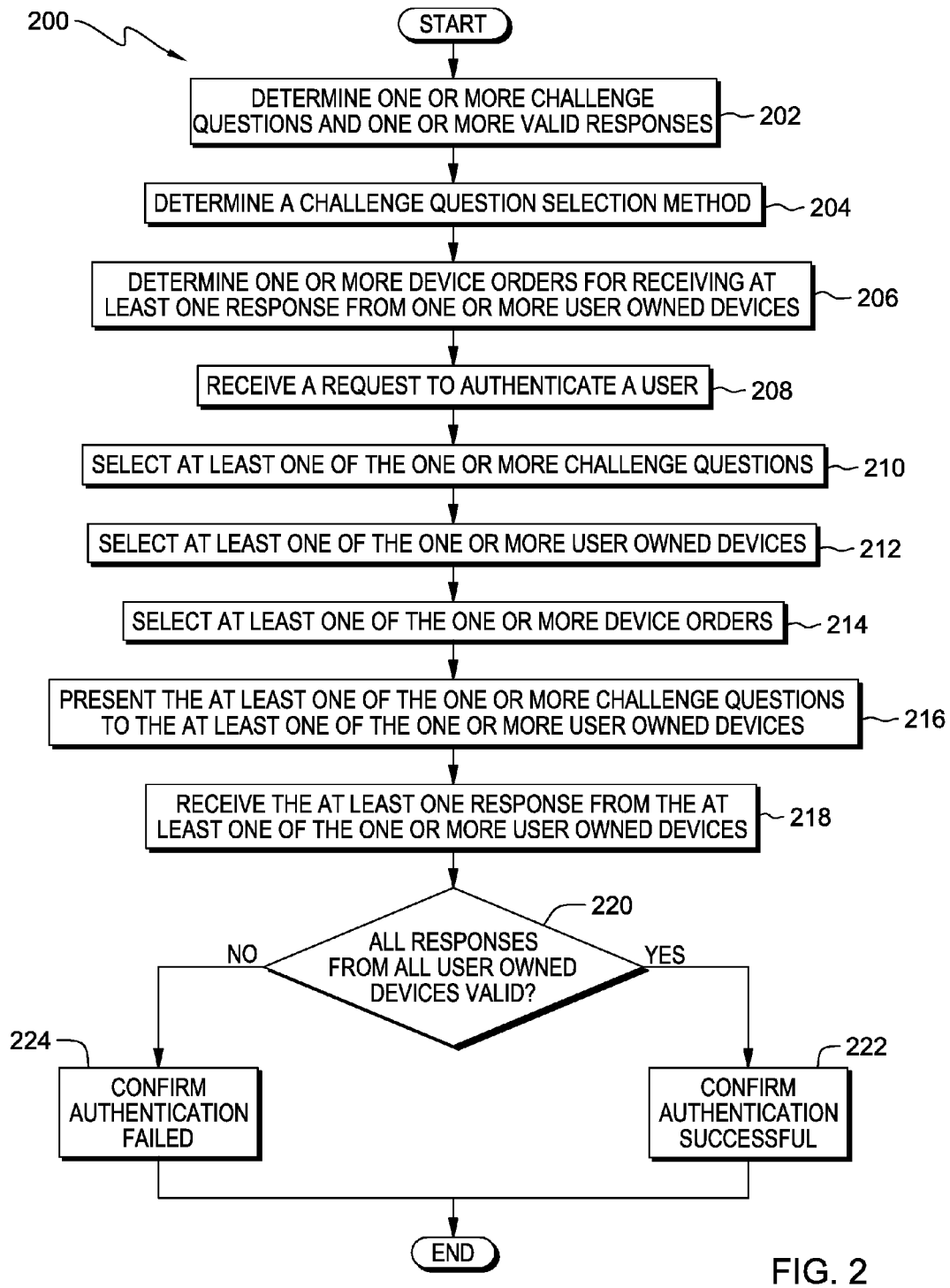
FIG. 2 illustrates a flowchart of an exemplary process flow, generally designated 200, for credential validation using multiple computing devices, in accordance with an embodiment of the present invention.

FIG. 2 illustrates a flowchart of an exemplary process flow, generally designated 200, for credential validation using multiple computing devices, in accordance with an embodiment of the present invention.

Validation program 116 determines one or more challenge questions and one or more valid responses (202). In the exemplary embodiment, validation program 116 determines one or more challenge questions to present to one or more user owned devices, wherein determining the one or more challenge questions includes, without limitation, randomly generating a set of challenge questions from a default list of generic questions, such as "What is your first pet's name," "What city were your born in," "What is your age," "What is your paternal grandfather's name," etc., prompting a user to provide one or more personalized challenge questions, and randomly generating a set of challenge questions from information provided in a user account, such as device specific attributes from one or more user owned devices, personal information, email addresses, etc. In the exemplary embodiment, validation program 116 determines one or more valid responses for the one or more challenge questions, wherein determining the one or more valid responses includes, without limitation, prompting a user to provide a response for each of the one or more challenge questions available and querying a user account for information that satisfies each of the one or more challenge questions. For example, in the case of a challenge question "What is the pin number on your smart phone," validation program 116 may prompt a user to provide a response for the challenge question (i.e., a user satisfies the prompt by providing the pin number 1-2-3-4), query the user's account for a pin number listed for the smart phone configured to the user's account, or perform any combination of the two to secure the response to the challenge question. In one embodiment, validation program 116 determines one or more challenge questions that prompt a user split up a valid response corresponding to the one or more challenge questions, wherein splitting up a valid response includes submitting at least one subset of the valid response across each of the user owned devices registered in the user account. For example, validation program 116 may prompt a user to provide a valid response for a challenge question "What is the pin number on your smart phone," such that a four digit pin number is submitted one number at a time, across four different user owned devices registered to the user account (e.g., first number from a first device, second number from a second device, third number from a third device, and fourth number from a fourth device). In the exemplary embodiment, validation program 116 stores a plurality of challenge questions and a plurality of valid responses in a database on a central server, such as server 104.

Validation program 116 determines a challenge question selection method (204). In the exemplary embodiment, validation program 116 determines a challenge question selection method (e.g., a method for selecting the one or more challenge questions to send to the target device(s)), wherein the challenge question selection method can include, without limitation, an ordered list selection method (e.g., a ranked list of a plurality of challenge questions, based, at least in part, on a user preference for a specific challenge question or a level of complexity of a specific challenge question), a random selection method (e.g., challenge questions are selected at random), a user specified selection method (e.g., a user pre-determines the one or more challenge questions to select), and a risk based selection method (e.g., harder challenge questions selected for more valuable systems and easier challenge questions selected for less valuable systems). In one embodiment, validation program 116 can randomly select the challenge question selection method from a pre-defined default list of a plurality of challenge question selection methods, promp the user to select the challenge question selection method from the pre-defined default list of the plurality of challenge question selection methods, or any combination of the two. In the exemplary embodiment, validation program 116 utilizes the challenge question selection method to select one or more challenge questions from the plurality of challenge questions stored in the database on the central server.

Validation program 116 determines one or more device orders for receiving at least one response from one or more user owned devices (206). In the exemplary embodiment, validation program 116 determines one or more device orders for receiving at least one response from one or more user owned devices, wherein the one or more device orders include, without limitation, a ranked device order (e.g., a ranked list of a plurality of user owned devices, based, at least in part, on user preference for a specific user owned device or a level of availability of a specific user owned device), a random device order (e.g., validation program 116 receives responses for the one or more user own devices at random), user specified device order (e.g., a user pre-determines the order of one or more user owned devices), and risk based device order (e.g., ordered by a level of security provided by the one or more user owned devices). In one embodiment, validation program 116 randomly selects the one or more device orders from a pre-defined default list of a plurality of device orders, prompts the user to select the one or more device orders from the pre-defined default list of the plurality of device orders, or any combination of the two. In the exemplary embodiment, validation program 116 utilizes the one or more device orders to define a valid order in which validation program 116 must receive the one or more responses to the one or more challenge questions to successfully validate a user's credentials.

Validation program 116 receives a request to authenticate a user (210). In the exemplary embodiment, validation program 116 receives a request to authenticate a user from, for example, a website configured to utilize an identity verification using computing device collaboration (IVCDC) service. In one embodiment, validation program 116 receives a request to verify a user's identity when a password reset request is initiated from the website. For example, a particular website, such as a banking website, agrees to utilize validation program 116 for identify verification using computing device collaboration. In response to a user creating an account with the particular website, validation program 116 may prompt the user to agree to credential validation using IVCDC. Additionally, the website may specify a requisite a minimum number of user owned devices in order for a user to qualify for identify verification using IVCDC. For example, the website may specify that five user owned devices, with each user owned device having a verification program agent application installed, is a minimum number of user owned devices in order for a user to qualify for identify verification using IVCDC. In one embodiment, in response to initiating a password reset request, the website sends a request to validation program 116 to verify a user's identity. In response to receiving a request to verify a user's identity, validation program 116 prompts the user to identify an initial device from the one or more user owned devices configured to their user account that is powered up and connected to a network, such as network 102.

Validation program 116 selects at least one of the one or more challenge questions (210). In the exemplary embodiment, validation program 116 selects at least one of the one or more challenge questions based, at least in part, on the challenge question selection method. For example, where validation program 116 determines a challenge question selection method as random, validation program 116 may select at random a challenge question, such as "What is your pin number", from the one or more challenge questions associated with the user account.

Validation program 116 selects at least one of the one or more user owned devices (212). In the exemplary embodiment, validation program 116 selects at least one of the one or more user owned devices to present the at least one of the one or more challenge questions, wherein selecting at least one of the one or more user owned devices includes querying a database for the one or more user owned devices associated with the user account. In one embodiment, validation program 116 selects a number of user owned devices based, at least in part, on a type of challenge question (i.e., for a divisible challenge question, for example, validation program 116 selects a number of user owned devices proportional to the number of divisions present in the divisible challenge question) and a level of security desired in credential validation (i.e., validation program 116 selects a number of user owned devices proportional to the level of security desired; for a high level of security, validation program 116 selects, for example, four or more devices, whereas for a low level of security, validation program 116 selects, for example, one device).

Validation program 116 selects at least one of the one or more device orders (214). In the exemplary embodiment, validation program 116 selects at least one of the one or more device orders based, at least in part, on a level of security desired in credential validation. For example, where a user or website desires a higher level of security in credential validation, as configured in a user profile, for example, validation program 116 selects a number and a type of device orders proportional to the level of security desired, such that validation program 116 may select a risked based device order such that validation program 116 receives a first response from a first user owned device having strong security features, a second response from a second user owned device having moderate security features, and a third response from a third user owned device having weak security features. In another example, where a user or website tolerates a lower level of security, validation program 116 may select a random device order such that validation program 116 receives one or more responses in no particular order from one or more user owned devices.

Validation program 116 presents the at least one of the one or more challenge questions to the at least one of the one or more user owned devices (216). In the exemplary embodiment, validation program 116 presents the at least one of the one or more challenge questions to the at least one of the one or more user owned devices by sending each of the one or more challenge questions to a validation program agent application present on each of the one or more user owned devices, wherein the validation program agent application presents each of the challenge questions to the user via, for example, a user interface, a text message, a pop-up notification, or any other suitable means for presenting a challenge question to the user. For example, validation program 116 may send a first challenge question "What is the first digit of your pin" to a smart phone, a second challenge question "What is the second and third digit of your pin" to a desktop computer, and a third challenge question "What is the fourth digit of your pin, enter the fourth digit after you have entered the second and the third digits" to the smart phone.

Validation program 116 receives the at least one response from the at least one of the one or more user owned devices (218). In the exemplary embodiment, validation program 116 receives the at least one response from the validation program agent application present on each of the one or more user owned devices. For example, validation program 116 may receive a response across a single device, such as a smart phone, or across multiple devices, such as a smart phone, a desktop computer, and a tablet.

In response to receiving the at least one response from the at least one of the one or more user owned devices, validation program 116 determines whether each response received from the at least one of the one or more user owned devices is a valid response relative to each of the one or more challenge questions and a determined device order (220). In the exemplary embodiment, validation program 116 determines whether each response received from the at least one of the one or more user owned devices is a valid response by cross-referencing each response received for each of the one or more challenge questions with a valid response stored in a database for each of the one or more challenge questions. In the case where validation program 116 determines that each response received from each of the one or more user owned devices relative to each of the one or more challenge questions matches the valid response associated with each of the one or more challenge questions presented, and the order in which each of the responses are received from each of the one or more user owned devices conforms with the selected device order, validation program 116 confirms authentication of a user is successful (YES branch 222). In the exemplary embodiment, validation program 116 confirms authentication of a user is successful by sending a notification, for example, to the user and the website, at which point the user and the website are allowed to proceed with a password reset and permit further access. In the case where validation program 116 determines that each response received from each of the one or more user owned devices relative to each of the one or more challenge questions does not match the valid response associated with each of the one or more challenge questions presented, or the order in that each of the responses are received from each of the one or more user owned devices does not conform with the selected device order, validation program 116 confirms authentication of a user has failed (NO branch 224). In the exemplary embodiment, validation program 116 confirms authentication of a user has failed by sending a notification, for example, to the user and the website, at which point the user and the website are not allowed to proceed with a password reset or permit further access.

Figure 3:
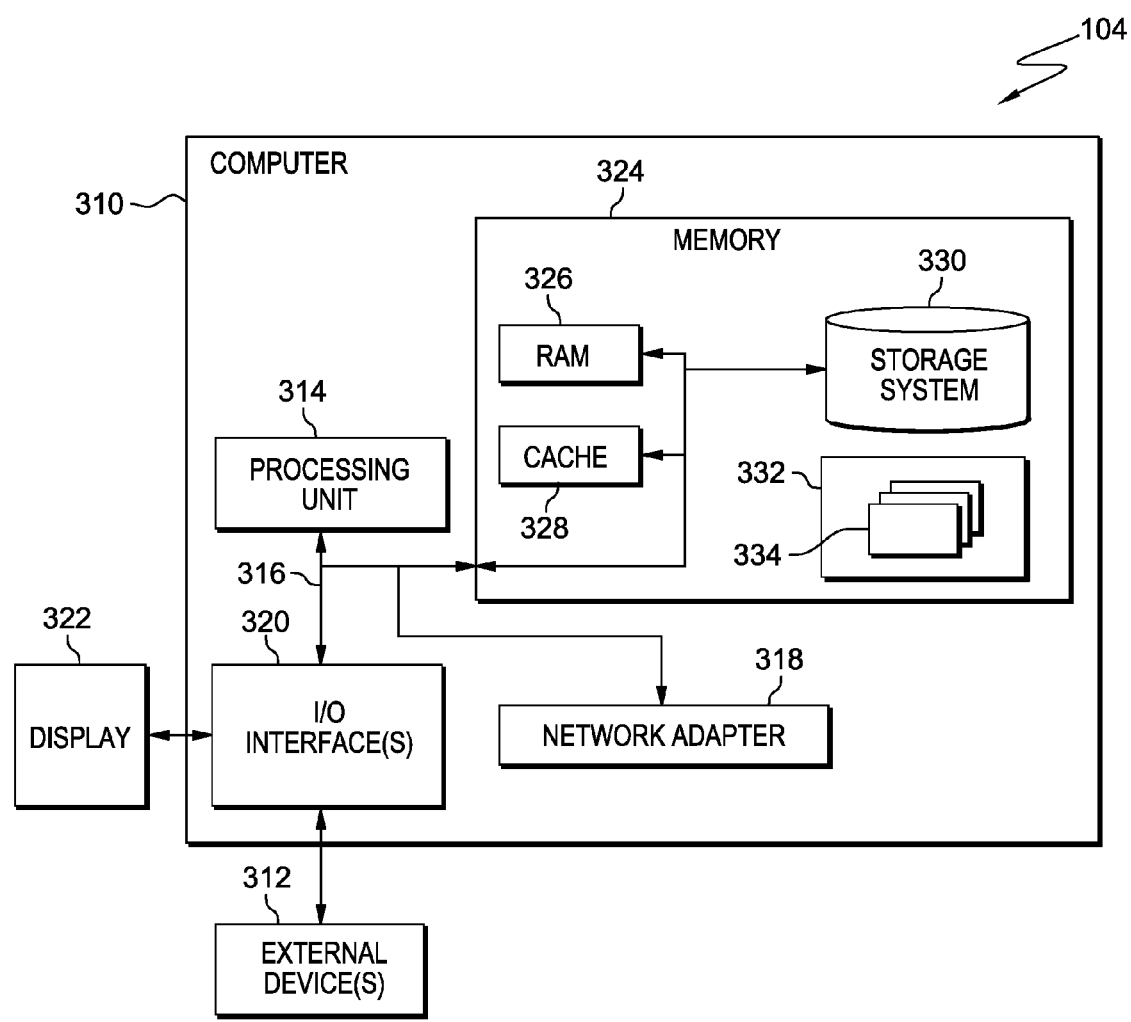
FIG. 3 illustrates a block diagram depicting components of a data processing system (such as server 104 of FIG. 1), in accordance with an embodiment of the present invention.

FIG. 3 depicts a block diagram of components of a data processing system of data processing environment 100, such as server 104, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device. The components of computer system 310 may include, but are not limited to, one or more processors or processing unit(s) 314, a system memory 324, and a bus 316 that couples various system components including system memory 324 to processing unit(s) 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

System memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, system memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external devices 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for credential validation using multiple computing devices, the method comprising the steps of:
    selecting, by one or more computer processors, at least one challenge question;
    selecting, by one or more computer processors, two or more user owned devices, wherein selecting the two or more user owned devices includes querying a database for each user owned device associated with a user account;
    presenting, by one or more computer processors, the at least one challenge question to the two or more user owned devices; and
    determining, by one or more computer processors, whether the at least one response received from the two or more user owned devices is a correct response relative to the at least one challenge question.

2. The method of claim 1, wherein selecting the at least one challenge question further comprises:
    determining, by one or more computer processors, one or more challenge questions and one or more valid responses corresponding to each of the one or more challenge questions; and
    determining, by one or more computer processors, a challenge question selection method for selecting the at least one challenge question, wherein the challenge question selection method includes at least one of:
    selecting at least one challenge question from ranked list of a plurality of challenge questions;
    selecting at least one challenge question from at random from a list of a plurality of challenge questions;
    selecting at least one challenge question from a user specified list of a plurality of challenge questions; and
    selecting at least one challenge question from a risk based list of a plurality of challenge questions.

3. The method of claim 1, further comprises:
    selecting, by one or more computer processors, at least one device order, based, at least in part, on a level of security desired in credential validation, wherein the at least one device order is proportional to a level of security desired in credential validation.

4. The method of claim 3, wherein selecting the at least one device order further comprises determining, by one or more computer processors, at least one device order for receiving at least one response from two or more user owned devices, wherein the at least one device order includes at least one of:
    a ranked order of devices from a plurality of user owned devices;
    a random order of devices from a plurality of user owned devices;
    a user specified order of devices from a plurality user owned devices; and
    a risk based order of devices from a plurality of user owned devices.

5. The method of claim 1, wherein presenting the at least challenge question to the two or more user owned devices, further comprises sending, by one or more computer processors, the at least one challenge question to a validation program agent application on the two or more user owned devices, wherein the validation program agent application presents the at least one challenge questions to a user via one or more of:
    a user interface;
    a text message; and
    a pop-up notification.

6. The method of claim 1, wherein determining whether the at least one response received from the at least one of two or more user owned devices is a valid response relative to the at least one challenge question, further comprises cross-referencing each response received for the at least one challenge question with a valid response for the at least one challenge question.

7. The method of claim 6, wherein cross-referencing each response received for the at least one challenge question with a valid response for the at least one challenge question, further comprises:
    determining, by one or more computer processors, whether each response received from each of the two or more user owned devices relative to each of the one or more challenge questions matches a valid response associated with each of the one or more challenge questions presented; and
    determining, by one or more computer processors, whether an order in which each response is received from each of the two or more user owned devices conforms with the selected device order.

8. The method of claim 7 further comprises:
    determining, by one or more computer processors, that authentication of a user is successful when each response received from the two or more user owned devices relative to the at least one challenge question matches a valid response associated with the at least one challenge question presented and the order in which each response is received from each of the two or more user owned devices conforms with the selected device order.

9. The method of claim 7 further comprises:
determining, by one or more computer processors, that authentication of a user has failed when at least one response received from the two or more user owned devices relative to the at least one challenge question does not match a valid response associated with the at least one challenge question presented or the order in which each response is received from each of the two or more user owned devices conforms with the selected device order.

10. A computer program product for credential validation using multiple computing devices, the computer program product comprising:
one or more computer readable storage media and program instructions stored on the one or more computer readable storage media, the program instructions comprising:
program instructions to select at least one challenge question;
program instructions to select two or more user owned devices, wherein selecting the two or more user owned devices includes querying a database for each user owned device associated with a user account;
program instructions to present the at least one challenge question to the two or more user owned devices; and
program instructions to determine whether the at least one response received from the two or more user owned devices is a correct response relative to the at least one challenge question.

11. The computer program product of claim 10, wherein program instructions to select the at least one challenge question further comprises:
program instructions to determine, by one or more computer processors, one or more challenge questions and one or more valid responses corresponding to each of the one or more challenge questions; and
program instructions to determine, by one or more computer processors, a challenge question selection method for selecting the at least one challenge question, wherein the challenge question selection method includes at least one of:
selecting at least one challenge question from ranked list of a plurality of challenge questions;
selecting at least one challenge question from at random from a list of a plurality of challenge questions;
selecting at least one challenge question from a user specified list of a plurality of challenge questions; and
selecting at least one challenge question from a risk based list of a plurality of challenge questions.

12. The computer program product of claim 10, further comprising:
program instructions to select at least one device order, based, at least in part, on a level of security desired in credential validation, wherein the at least one device order is proportional to a level of security desired in credential validation.

13. The computer program product of claim 12, wherein program instructions to select the at least one device order further comprises program instructions to determine, by one or more computer processors, at least one device order for receiving at least one response from two or more user owned devices, wherein the at least one device order includes at least one of:
a ranked order of devices from a plurality of user owned devices;
a random order of devices from a plurality of user owned devices;
a user specified order of devices from a plurality user owned devices; and
a risk based order of devices from a plurality of user owned devices.

14. The computer program product of claim 10, wherein program instructions to present the at least challenge question to the two or more user owned devices, further comprise program instructions to send, by one or more computer processors, the at least one challenge question to a validation program agent application on the two or more user owned devices, wherein the validation program agent application presents the at least one challenge questions to a user via one or more of:
a user interface;
a text message; and
a pop-up notification.

15. The computer program product of claim 10, wherein program instructions to determine whether the at least one response received from the at least one of two or more user owned devices is a valid response relative to the at least one challenge question, further comprises program instructions to cross-reference each response received for each of the one or more challenge questions with a valid response for the at least one challenge question.

16. The computer program product of claim 15, wherein program instructions to cross-reference each response received for the at least one challenge question with a valid response for the at least one challenge question, further comprises:
program instructions to determine, by one or more computer processors, whether each response received from each of the two or more user owned devices relative to each of the one or more challenge questions matches a valid response associated with each of the one or more challenge questions presented; and
program instructions to determine, by one or more computer processors, whether an order in which each response is received from each of the two or more user owned devices conforms with the selected device order.

17. The computer program product of claim 16 further comprises:
program instructions to determine, by one or more computer processors, that authentication of a user is successful when each response received from the two or more user owned devices relative to the at least one challenge question matches a valid response associated with the at least one challenge question presented and the order in which each response is received from each of the two or more user owned devices conforms with the selected device order.

18. The computer program product of claim 16 further comprises:
program instructions to determine, by one or more computer processors, that authentication of a user has failed when at least one response received from the two or more user owned devices relative to the at least one challenge question does not match a valid response associated with the at least one challenge question presented or the order in which each response is received from each of the two or more user owned devices conforms with the selected device order.

19. A computer system for credential validation using multiple computing devices, the computer system comprising:
- one or more computer readable storage media;
- program instructions stored on at least one of the one or more computer readable storage media for execution by at least one of the one or more computer processors, the program instructions comprising:
- program instructions to select at least one challenge question;
- program instructions to select two or more user owned devices, wherein selecting the two or more user owned devices includes querying a database for each user owned device associated with a user account;
- program instructions to present the at least one challenge question to the two or more user owned devices; and
- program instructions to determine whether the at least one response received from the two or more user owned devices is a correct response relative to the at least one challenge question.

20. The computer system of claim 19, wherein program instructions to determine whether the at least one response received from the at least one of two or more user owned devices is a valid response relative to the at least one challenge question, further comprises program instructions to cross-reference each response received for the at least one challenge question with a valid response for each of the at least one challenge questions.

* * * * *